E. D. & O. B. REYNOLDS.
Rotary Harrow.
No 46,025.  Patented Jan. 24, 1865.
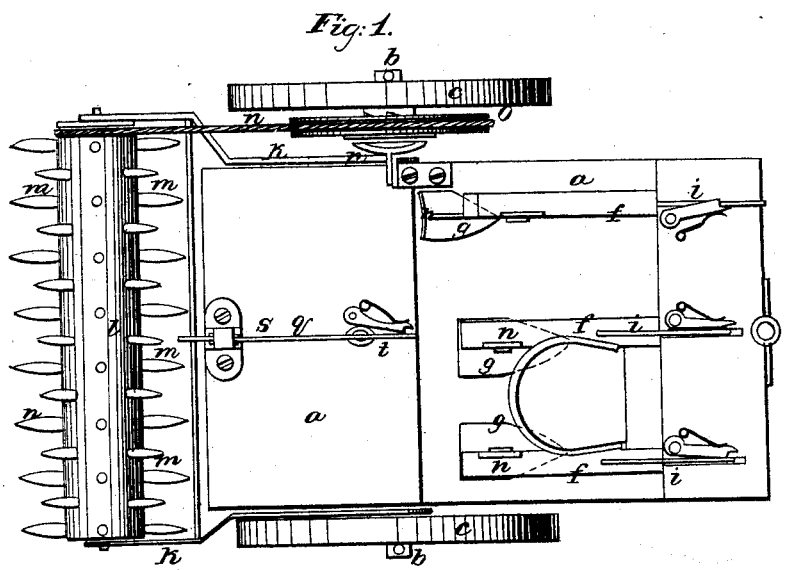
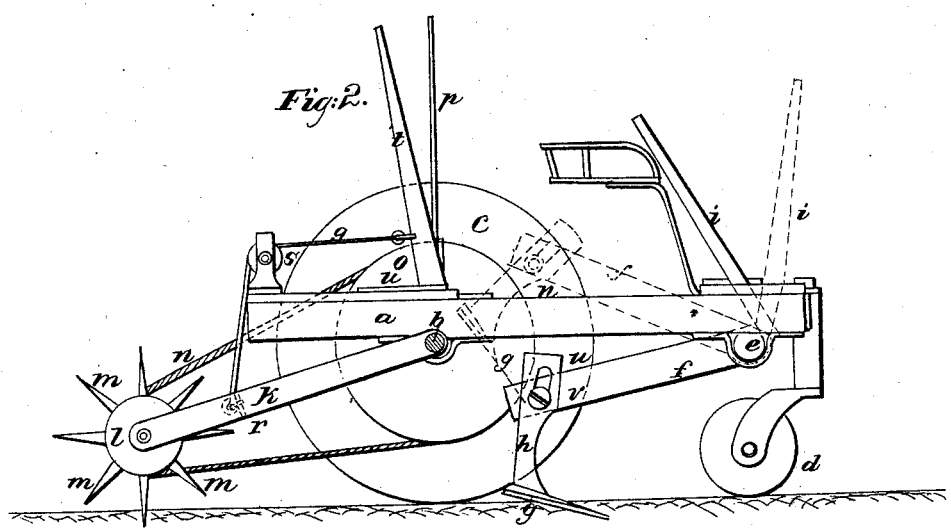

UNITED STATES PATENT OFFICE.

EDMUND D. REYNOLDS AND O. BRADFORD REYNOLDS, OF NORTH BRIDGE-WATER, MASSACHUSETTS.

IMPROVEMENT IN COMBINED CULTIVATOR AND HARROW.

Specification forming part of Letters Patent No. 46,025, dated January 24, 1865.

*To all whom it may concern:*

Be it known that we, EDMUND D. REYNOLDS and O. BRADFORD REYNOLDS, of North Bridgewater, in the county of Plymouth and State of Massachusetts, have invented an Improved Combined Cultivator and Harrow; and we do hereby declare that the following, taken in connection with the drawings which accompany and form part of this specification, is a description of our invention sufficient to enable those skilled in the art to practice it.

This invention relates to the construction of wheel-cultivators; and the improvement consists in the combination and arrangement of a series of cultivator teeth or shares with a series of rotary harrow-teeth, (placed in rear of the shares and driven by the wheel or wheels of the carriage,) the series of cultivator-shares and the cylinder of rotary teeth being hinged respectively to the frame or carriage, so that they rest loosely upon the surface of the ground while operating, their extent of penetration being determined by their capability of movement below the plane of the draft and guide wheels of the carriage and the movement of the carriage.

Figure 1 of the drawings represents a plan of the machine; Fig. 2, a side elevation thereof with the nearest wheel removed.

$a$ denotes the frame or body of the carriage, hung upon an axle, $b$, which is mounted upon draft-wheels $c$. The front end of the carriage is supported upon the shaft of a guide-wheel, $d$, the three wheels keeping the carriage-frame in a fixed position or elevation above the surface of the ground.

The pole or shafts are attached in any suitable manner to the forward end of the frame $a$. The front end of this frame supports a long bolt or shaft, $e$, which serves as a hinge to a series of bent levers, $f$, turning thereon, the rear ends of the levers having each a share, $g$, fastened thereto by an arm, $h$, and a slot and bolt, as seen in Fig. 2. The front end of each lever is a handle, $i$, extending up through a slot in the frame $a$, a spring-latch being so applied to the top of the frame that each handle, when the share is lifted thereby to the position shown by dotted lines in Fig. 2, can be fastened in such position.

Long arms $k$ are jointed to the axle $b$, and project rearward therefrom, a drum, $l$, being hung upon the outer ends thereof, said drum being provided with a series of harrow-teeth, $m$, projecting therefrom, as seen in the drawings. A band, $n$, passes around the drum $l$, and a pulley, $o$, connected with the adjacent wheel $c$, so that rotation of the drum is effected by the movement of the carriage. The pulley $o$ connects with the hub of the wheel $c$ by a clutch apparatus, so that by movement of a clutch-lever, $p$, the pulley can be connected with or disconnected from the wheel, so as to impart rotary motion to the teeth $m$, or stop such rotation, as circumstances may require. A cord or chain, $q$, is fastened at one end to a bar, $r$, connecting the two arms $k$, and, passing over a sheave, $s$, is fastened at its opposite end to a hand-lever, $t$.

When the machine is moving over ground not to be operated upon, the pulley $o$ is unclutched from the wheel $c$ and the drum $l$ is elevated by the lever $t$, a spring-latch, $u$, holding the drum in elevated position, or so that its teeth do not come in contact with the ground. The shares $g$ are also raised by the levers $f$, and fastened in the position denoted by the dotted lines in Fig. 2. Now, when it is desirable to operate the machine, it is only necessary to unlatch the levers $f$ and $t$ and let the shares $g$ and teeth $m$ down upon the surface of the ground, the angle of presentation of the shares causing them to enter the soil, and the wheels determining the depth of penetration, while the weight of the drum $l$ causes the teeth $m$ to penetrate sufficiently into the soil plowed up by the cultivator-shares to disintegrate or pulverize it, the contact of the successive series of the rotating teeth preventing too deep penetration. Each share $g$ is so applied to its lever as to be capable of adjustment to regulate the extent of its movement below the plane of the bearing-surfaces of the wheels, a slot, $u$, in the arm $h$ and a screw or bolt, $v$, passing through the same into the lever $f$, serving for this purpose.

We claim—

The combination of the cultivator-shares $h$ and rotary harrow-teeth $m$, when so arranged with respect to a carriage, $a$, that they are self-adjusting in their action upon the soil being cultivated, substantially as set forth.

In witness whereof we have hereunto set our hands this 30th day of November, A. D. 1864.

EDMUND D. REYNOLDS.
  O. BRADFORD REYNOLDS.

In presence of—
 GEO. W. BRYANT,
 A. J. HANSON.